(12) United States Patent
Ai et al.

(10) Patent No.: US 11,094,984 B1
(45) Date of Patent: Aug. 17, 2021

(54) SWELLING RESISTANT POUCH BATTERIES

(71) Applicant: Amazon Technologies, Inc., Seattle, WA (US)

(72) Inventors: Zhigang Ai, Changzhou (CN); James Robert Lim, Mountain View, CA (US); Jing Cao, Shenzhen (CN); Haoxing Zhang, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 932 days.

(21) Appl. No.: 15/457,828

(22) Filed: Mar. 13, 2017

(51) Int. Cl.
| | | |
|---|---|---|
| *H01M 10/0525* | (2010.01) | |
| *H01M 10/42* | (2006.01) | |
| *H01M 50/124* | (2021.01) | |
| *H01M 50/116* | (2021.01) | |

(52) U.S. Cl.
CPC ..... *H01M 50/124* (2021.01); *H01M 10/0525* (2013.01); *H01M 10/425* (2013.01); *H01M 50/116* (2021.01); *H01M 2010/4271* (2013.01); *H01M 2220/30* (2013.01)

(58) Field of Classification Search
CPC .. H01M 2/0287; H01M 2/026; H01M 2/0275; H01M 2/0277; H01M 2/0285; H01M 10/0525; H01M 10/425; H01M 10/48
See application file for complete search history.

(56) References Cited

U.S. PATENT DOCUMENTS

| | | | | |
|---|---|---|---|---|
| 4,032,696 | A | * | 6/1977 | Urry ................ H01M 6/08 429/101 |
| 2005/0084749 | A1 | * | 4/2005 | Hwang ............. H01M 2/0202 429/127 |
| 2007/0231687 | A1 | * | 10/2007 | Kim ................ H01M 2/1094 429/208 |
| 2011/0255250 | A1 | * | 10/2011 | Dinh ................ G03B 15/03 361/749 |
| 2014/0113184 | A1 | * | 4/2014 | Hamel ............. H01M 2/0207 429/179 |
| 2015/0037649 | A1 | * | 2/2015 | Wyatt .............. H01M 10/625 429/120 |
| 2015/0198673 | A1 | * | 7/2015 | Yang ................ H01M 6/5083 429/61 |
| 2016/0233470 | A1 | * | 8/2016 | Kim ................ H01M 2/1061 |
| 2016/0336552 | A1 | * | 11/2016 | MacLean .......... H01M 2/08 |

* cited by examiner

*Primary Examiner* — Miriam Stagg
*Assistant Examiner* — Rachel L Zhang
(74) *Attorney, Agent, or Firm* — Eversheds Sutherland (US) LLP

(57) ABSTRACT

Systems, methods, and computer-readable media are disclosed for swelling resistant pouch batteries. In one embodiment, an example battery may include a pouch having an aluminum layer with a first portion and a second portion, and at least one cell that is partially positioned within the pouch. The at least one cell may include an anode, a separator, a cathode, and an electrolyte. Example pouch batteries may include a circuit electrically coupled to the cathode and to the first portion of the aluminum layer, where the circuit is configured to cause a electric potential difference at the aluminum layer with respect to the anode, and a first electrical contact electrically coupled to the first portion of the aluminum layer.

20 Claims, 6 Drawing Sheets

SWELLING RESISTANT POUCH BATTERIES

BACKGROUND

Electronic devices may include batteries or other portable power sources. Certain batteries may be subject to swelling, expanding, or otherwise changing form over time. For example, a pouch battery may swell in the event that the pouch battery is damaged. Swollen or expanded batteries may cause damage to a device, such as causing a device housing to expand, a device screen to crack, or other damage. In some instances, swollen or otherwise damaged batteries may create a safety hazard for users. Accordingly, preventing swelling or other changes in form of batteries may be desired.

Figure 1:
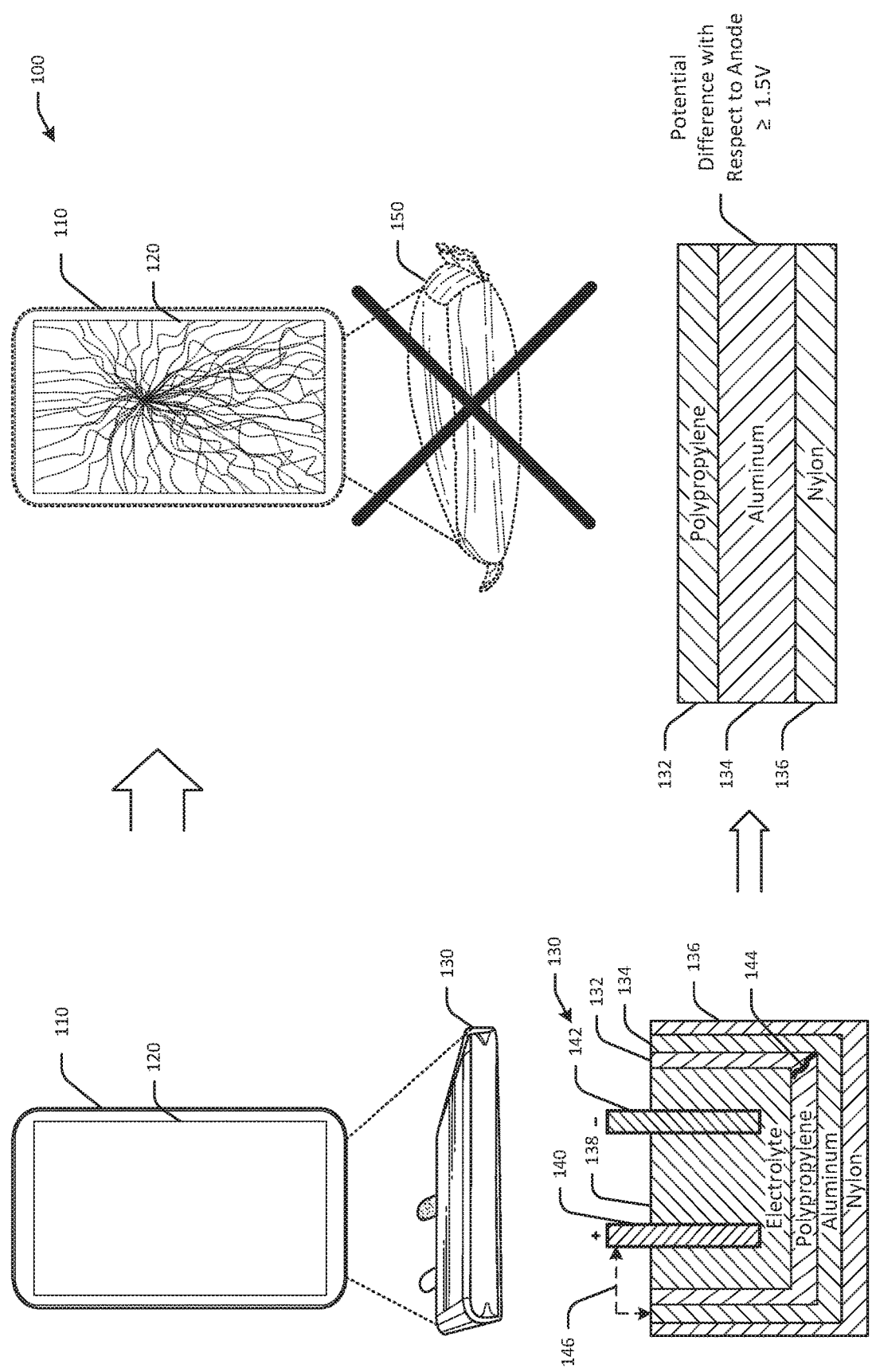
FIG. 1 is an example use case and schematic drawing of an electronic device with a swelling resistant pouch battery in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Electronic devices may be used to consume content. Some electronic devices may be portable and may include portable power sources, such as batteries and the like. The batteries or power sources may be rechargeable. Batteries used in electronic devices may have various form factors. For example, some batteries may be pouch batteries, some batteries may be cylindrical batteries, some batteries may be cells or packs, and so forth. Batteries may be removably positioned in some devices, while it other devices batteries may be positioned in fixed locations or may otherwise be embedded, non-removable and/or non-replaceable in a device.

The location of a battery or power source in a device may be dimensioned so as to accommodate a particular battery form factor and/or size. Accordingly, any changes to a form factor and/or size of a battery may result in strains or stresses imparted on other components of the device. For example, if a pouch battery expands or swells from its initial form factor, the expanded or swollen battery may impart a strain on a display of the device. If the pouch battery expands or swells enough, the display and/or other components of the device may be damaged. For example, the display may crack or shatter, the device housing may expand, components of the device may become lose, and the like. While certain batteries may be designed to accommodate a small amount of swelling, such as 10% swelling in a Z-direction or thickness of a pouch battery, such batteries may be unprotected against abnormal swelling or bulge situations, which could be caused, in one example, by gas swelling.

A battery may be a single cell, multiple cells, a pack, and the like, and may be referred to herein as a "cell." Certain batteries or power sources, such as pouch batteries, may expand or swell as a result of damage to one or more components of the battery. For example, if one or more layers of a battery pouch are damaged and/or come into contact with electrochemical components of the cell, the layers (e.g., the pouch aluminum layer, etc.) may corrode, which may weaken the pouch structure and result in expansion or swelling of the pouch battery. The expansion or swelling may cause damage to the device and/or create a safety hazard or a perceived safety hazard to a user of the device.

Embodiments of the disclosure include batteries that are corrosion-resistant and/or resistant to swelling. Such batteries may prevent swelling or damage to components of a battery, such as a pouch material, even in the event of damage to one or more components of the battery. For example, some embodiments may include pouch batteries that include a pouch material with an aluminum layer. A voltage potential may be imparted at the aluminum layer to prevent corrosion of the aluminum layer, even if damage to the pouch material causes the aluminum layer to come in contact with an electrolyte of the battery. The aluminum layer may have an electric potential difference, or a potential difference of equal to or greater than about 1.5 volts, as measured with respect to the anode. As a result, the aluminum layer will resist corrosion, and the pouch battery may be prevented from expansion and/or swelling. Batteries of the disclosure may be any suitable battery that is susceptible to packaging corrosion and/or batteries with failure modes that include swelling, such as a lithium-ion battery, an alkaline primary battery, and may have exterior pouches, casings, or housings comprised at least partially of metal.

This disclosure relates to, among other things, systems, methods, computer-readable media, techniques, and methodologies for swelling resistant pouch batteries. Embodiments may include batteries with pouches or housings that have certain voltage potentials, which may reduce or remove a risk of corrosion, and therefore swelling, of the battery. Such embodiments may not consume additional energy or otherwise cause premature drainage or exhaustion of the battery.

Referring to FIG. 1, an example environment 100 with a device 110 is illustrated in accordance with one or more embodiments of the disclosure. The device 110 may be any suitable portable device, such as a smartphone, an e-reader, a tablet, an audio or video streaming device, an Internet of Things (IoT) device, a product ordering button or device, a home sensor, an aging in place device, an earphone, a speaker device, or another device. In the example of FIG. 1, the device 110 may be a smartphone with a display 120. The device 110 may include a pouch battery 130 positioned within the device 110, such as within a housing of the device 110. The pouch battery 130 may power the device 110.

The pouch battery 130 may include a pouch that forms a housing or outer casing of the pouch battery 130. The pouch may be formed at least partially of a polymer. The pouch of the pouch battery 130 may be flexible, so as to allow for flexibility in positioning of the pouch battery 130 in the device 110. The pouch may be formed of one or more layers. For example, in FIG. 1, the pouch of the pouch battery 130 may be formed of a trilaminate material. The trilaminate material may include a first layer 132 that may be formed at least partially of polypropylene, a second layer 134 that may be formed at least partially of aluminum, and a third layer 136 that may be formed at least partially of nylon. The second layer 134 may be positioned between the first layer 132 and the third layer 136 in a laminated stack. The polypropylene first layer 132 may be flexible and chemically resistant, and may be in contact with electrolyte, and may be a thermoplastic material, so as to allow impulse (heat and pressure) sealing of the pouch. The aluminum second layer 134 may be a high barrier film (hermetic barrier) against oxygen and moisture ingress. The nylon third layer 136 may have oxygen, water, and particulate barrier properties, and may protect against abrasion (scratches), punctures, tears, and the like. Other embodiments may include additional or fewer layers and/or layers formed of different materials.

The pouch battery 130 may include a cell portion, which may include an electrolyte material 138, one or more cathodes 140, and one or more anodes 142. The electrolyte material 138 may be a liquid, gel, solid, or dry polymer electrolyte and may include lithium salts, organic solvents, additives, and other components. The electrolyte material 138 may separate the cathode 140 from the anode 142. The cell may be at least partially positioned within the pouch of the pouch battery, and may be a lithium-ion cell, a lithium-polymer cell, or another cell type.

The first layer 132 may be an inside layer of the pouch, in that the first layer 132 is in contact with or otherwise adjacent to a cell portion or interior portion of the pouch battery 130. The polypropylene first layer 132 may be positioned between the aluminum second layer 134 and the electrolyte material 138. For example, the first layer 132 may be in contact with the electrolyte material 138. The first layer 132 may form a barrier between the electrolyte material 138 and the aluminum second layer 134, because the electrolyte material 138 may cause corrosion of the aluminum second layer 134. The nylon third layer 136 may form an outer layer or outer portion of the pouch and/or the pouch battery 130.

In some instances, such as if the device 110 and/or pouch battery 130 is subject to shock or damage over time, a crack 144 or other damage may develop in the polypropylene first layer 132 of the pouch material. The crack 144 may allow the electrolyte material 138 to seep through and/or otherwise come into contact with the aluminum second layer 134.

Contact between the electrolyte material 138 and the aluminum second layer 134 may ordinarily cause corrosion of the aluminum second layer 134, which may result in a swollen pouch battery 150. Specifically, corrosion of the aluminum second layer 134 may lead to a break in the hermetic seal, allowing air and moisture to ingress into the cell, which then, upon internal reactions, may cause excessive gas production and abnormal swelling. As shown in FIG. 1, the swollen pouch battery 150 may cause damage to the device 110, such as a cracked screen 120. The electrolyte material 138 may reduce a potential voltage of the aluminum second layer 134, which may cause electrochemical corrosion (e.g., tripod electrode effect, etc.).

However, the pouch battery 130 may include an electrical connection 146 between the cathode 140 and the aluminum second layer 134. The electrical connection 146 may impart a voltage potential equal to or greater than about 1.2 volts and less than or equal to about 5.0 volts, as shown in FIG. 1. The potential difference between the aluminum second layer 134 and the anode may be equal to or greater than about 1.5 volts. The voltage potential at the aluminum second layer 134 may be created via the electrical connection 146. The voltage potential or potential difference may prevent corrosion of the aluminum second layer 134, even though the aluminum second layer 134 may be in contact with the electrolyte material 138. As a result, swelling or expansion of the pouch battery 130 may be prevented or avoided. The voltage potential or potential difference may not cause consumption of the power or current generated or created by the pouch battery 130 because the voltage potential or potential difference and/or electrical connection 146 may be an open circuit.

As a result, performance or functionality of the pouch battery 130 may not be affected. Some embodiments may include a protection circuit module or another circuit that may be used to create an electrical connection between the cathode and aluminum layers of a pouch battery, as well as to provide test points for determining presence of the electrical connection. Certain embodiments may prevent battery swelling due to water ingress into a pouch battery via electrically connecting an aluminum pouch interlayer to a positive electrode of the battery, so as to maintain the aluminum metal potential within its electrochemically stable passivation range, and prevent corrosion of the aluminum layer.

Example embodiments of the disclosure provide a number of technical features or technical effects. For example, in accordance with example embodiments of the disclosure, certain embodiments of the disclosure may include batteries with a voltage potential imparted to one or more layers of a pouch material for a pouch battery. The voltage potential may reduce or prevent corrosion of the one or more layers, and may therefore prevent swelling and/or expansion of the battery. Some embodiments may include circuits or protection circuit modules that can be used to test and/or create electrical connections between, for example, a cathode and an aluminum layer of a laminate pouch material. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
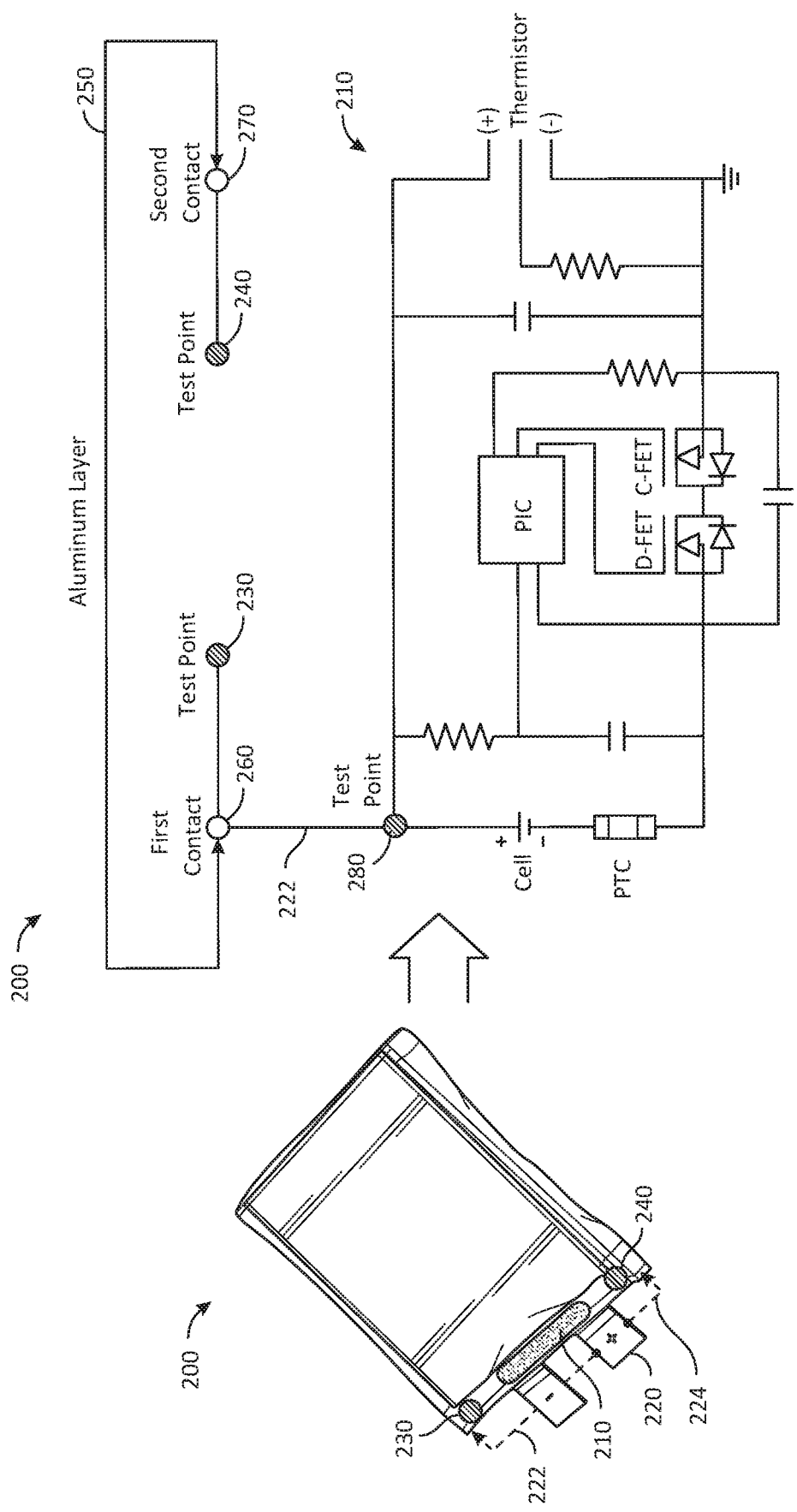
FIG. 2 is a schematic drawing of a swelling resistant pouch battery and protection circuit in accordance with one or more embodiments of the disclosure.

Referring to FIG. 2, a schematic drawing of a swelling resistant pouch battery 200 and a protection circuit 210 is depicted in accordance with one or more embodiments of the disclosure. The pouch battery 200 may be a lithium-ion battery, a lithium-polymer battery, or another type of battery.

The protection circuit 210 may be a protection circuit module or another circuit that may be configured to prevent overheating and/or otherwise manage one or more aspects of the operation or usage of the pouch battery 200. The protection circuit 210 may be positioned external to the pouch battery 200 in some embodiments. For example, the protection circuit 210 may be attached to an outside of the pouch battery 200. In some embodiments, the protection circuit 210 may be positioned at a cell terrace location of the pouch battery 200, as illustrated in FIG. 2. The cell terrace portion of the pouch battery 200 may be a portion or an area of the pouch battery 200 that is between or adjacent to a cathode 220 and an anode of the pouch battery 200. In one example, the cell terrace area may be an area about the pouch battery 200 where the cathode and/or anode components are externally accessible. The cell terrace portion may be horizontal or vertical with respect to a central axis of the pouch battery 200. In some embodiments, the protection circuit 210 may be integrated into, or otherwise form a part of, an electronic device in which the pouch battery 200 is placed. The protection circuit 210 may be attached to an outside portion of the pouch battery 200. The protection circuit 210 may be coupled to the cathode 220 and/or the anode of the pouch battery 200, and may include one or more charge control FETs, one or more discharge control FETs, one or more thermistors, and/or one or more fuses or positive temperature coefficient devices, and may protect or prevent overcurrent or overheating of the pouch battery 200. One or more other components, such as a protection integrated circuit (PIC), positive thermal coefficient material (PTC), and the like may be included.

The pouch battery 200 may include a pouch that forms an outer portion of the pouch battery 200. The pouch may include an aluminum layer 250. The cathode 220 may be positioned at least partially inside the pouch battery 200. In some instances, such as the example of FIG. 2, at least a portion of the cathode 220 may be exposed outside the pouch battery 200. In other embodiments, the cathode 220 or a component in electrical communication with the cathode 220 may be exposed or otherwise accessible from outside the pouch battery 200.

The cathode 220 of the pouch battery 200 may be in electrical communication with the aluminum layer 250 of the pouch battery 250. For example, as illustrated in FIG. 2, a first electrical connection 222 between the cathode 220, or the positive terminal, of the pouch battery 200 may be in electrical communication with the aluminum layer at a first contact 260. The first contact 260 may be a point of contact between the aluminum layer 250 and an electrical connection component, such as a clip, a wire, a solder joint, a staple, a weld, and the like, of the first electrical connection 222. The first contact 260 may be at a first corner of the pouch battery 200.

The cathode 220 may optionally also be in electrical communication with the aluminum layer 250 at a second contact 270. The second contact 270 may be a second point of contact between the aluminum layer 250 and the cathode 220. For example, a second electrical connection 224 may be formed between the cathode 220 and a second corner, or a second contact 270 of the pouch battery 200. Some embodiments may have one point of contact between the cathode and the aluminum layer, while other embodiments may include more than one point of contact between the cathode and the aluminum layer.

One or more test points may be included at the pouch battery 200. The test points may be used to test whether an electrical connection is present between the aluminum layer 250 and the cathode 200 of the pouch battery 200. The test points may be in electrical communication with one or more of the contact points, and may be externally accessible for testing, for example, with a multimeter device or battery protection circuit module functional testing machine or module.

In FIG. 2, a first test point 230 may be positioned at or near the first corner of the pouch battery 200, and may be in electrical communication with the first contact 260. A second test point 240 may be in electrical communication with the second contact 270. A user may use a multimeter or another device to determine whether an electrical connection is present. For example, if a multimeter were used at the first test point 230 and the second test point 240 in FIG. 2, a result of a short circuit (e.g., low or no impedance, etc.) may indicate that the aluminum layer 250 is in contact with the cathode 220. Another result may indicate that there is no electrical connection between the cathode 220 and the aluminum layer 250.

The first test point 230 and the second test point 240 may therefore be used to determine that the aluminum layer 250 is in contact with the cathode 220. To obtain a measurement, solid connections at three junctions may be used: 1) the first test point 230 and/or the second test point 240; 2) the aluminum layer; and 3) the cathode 220. Some embodiments may therefore include an optional third test point 280 that is positioned along a positive power line in electrical communication with the cathode or positive terminal, and may be positioned in between the cathode and one or more of the first test point 230 and the second test point 240. The optional third test point 280 may be downstream in the power path, anywhere on the positive line, and may be used to verify that the first contact 260 junction is solid via all three junctions.

Figure 3:
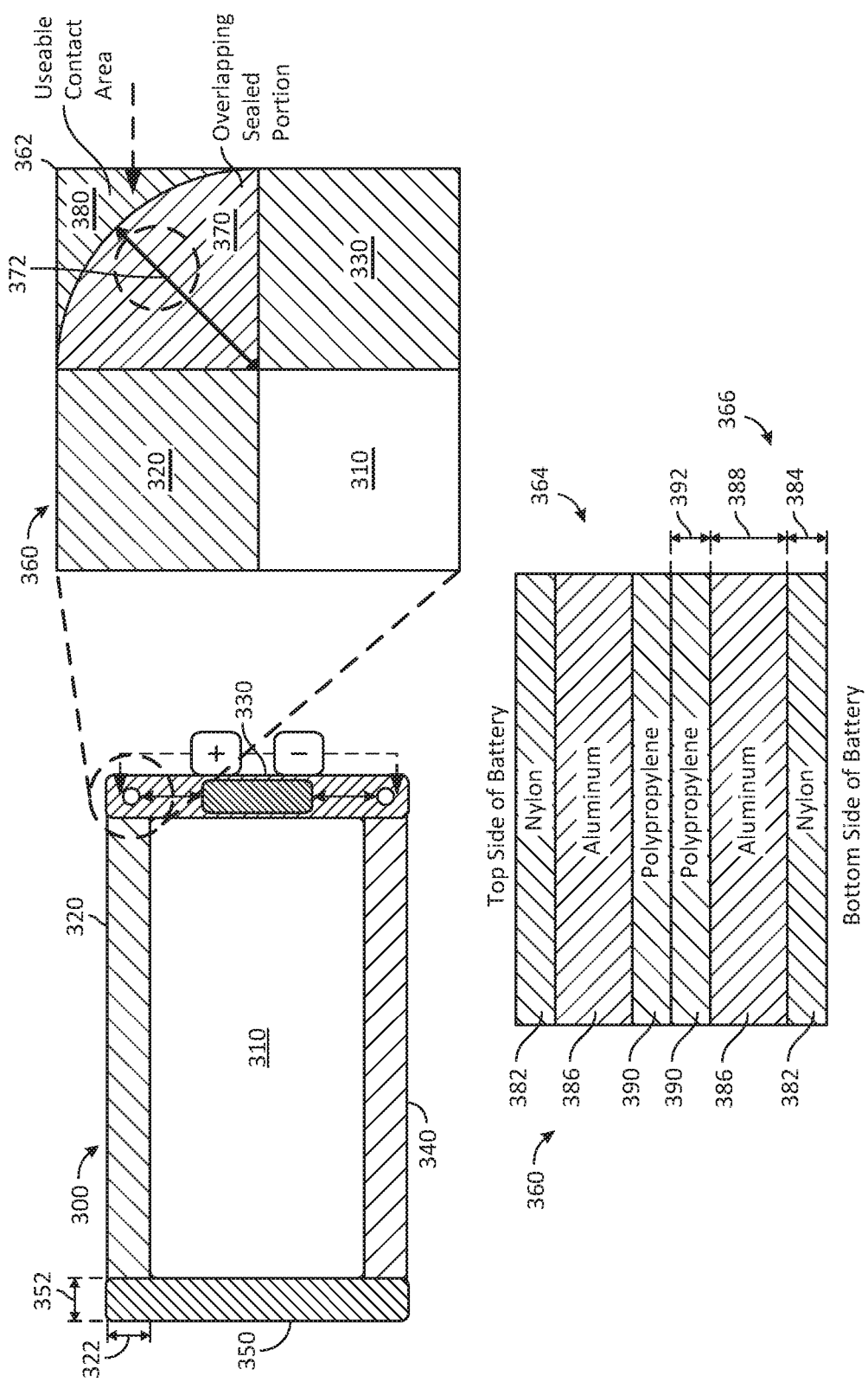
FIG. 3 is a schematic drawing of a swelling resistant pouch battery with sealed edges in accordance with one or more embodiments of the disclosure.

FIG. 3 depicts a swelling resistant pouch battery 300 with sealed edges in accordance with one or more embodiments of the disclosure. The pouch battery 300 may have a rectangular geometry in some embodiments. Other embodiments may include geometries such as stepped, contoured, shaped, and/or tube cell designs. As illustrated in the top view of FIG. 3, the pouch battery 300 may have a pouch with one or more sealed edges. In some embodiments, the pouch may be formed by folding material over itself, while in other embodiments, the pouch may be formed by two or more discrete portions of material sealed together. The sealed portions or edges of the pouch may form an inner portion or a pouch interior portion 310 in which a cell (e.g., electrolyte, cathode, anode, etc.) may be placed.

The pouch battery 300 may include a first sealed portion 320 at a first side of the pouch, a second sealed portion 340 at a second side of the pouch, and an optional third sealed portion 350 at a third side of the pouch. Other embodiments may include one or more fold sides that may be folded instead of sealed. For example, the third side may be a fold side instead of a sealed side. The first sealed portion 320 and the second sealed portion 340 may be parallel to each other, or at opposite sides of the pouch. The third side may be perpendicular to the first side and the second side of the pouch. The pouch battery 300 may include a fourth sealed portion 330 that is at a "top side" of the pouch battery 300, which may be a side of the pouch battery at which the cathode and/or anode are externally accessible. The fourth sealed portion 330 may be perpendicular to the first sealed portion 320 and/or the second sealed portion 340, and may be parallel to the third sealed portion 350. The sealed portions may be impulse sealed, such as heat sealed, pressure sealed, or another form of sealing that causes an upper layer of the pouch to seal or bond with a lower layer of the pouch.

The first sealed portion 320 may have a first sealed width 322 that may be a width of the first sealed portion 320. The first sealed width 322 may be measured, in some embodiments, from an edge of the pouch. For example, the first sealed portion 320 may be a first impulse sealed portion that has a width from a first edge of the pouch to the interior portion 310 of the pouch, the second sealed portion 340 may be a second impulse sealed portion has the width from a second edge of the pouch to the interior portion 310, and the fourth sealed portion 330 may be a fourth impulse sealed portion that has the width from a top edge of the pouch to the interior portion 310.

The first sealed portion 320 and the second sealed portion 340 may have the same or different sealed widths. The third sealed portion 350 may have a second sealed width 352. The second sealed width 352 may be the same or different than the first sealed width 322. The fourth sealed portion 330 may have the same sealed width as the first sealed width 322, the second sealed width 352, or a different width.

The fourth sealed portion 330 may at least partially overlap with one or more of the first sealed portion 320 and the second sealed portion 340. For example, in FIG. 3, the fourth sealed portion 330 may overlap with the first sealed portion 320 at a first corner area 360 of the pouch battery 300. As shown in the detail view of FIG. 3, an overlap portion 370 may be a portion of the pouch battery 300 that the fourth sealed portion 330 overlaps with the first sealed portion 320. The fourth sealed portion 330 may overlap with the second sealed portion 340 at another corner area, as shown in FIG. 3. Similarly, the third sealed portion 350 may overlap with one or more of the first sealed portion 320 and the second sealed portion 340.

A portion of the first corner area 360 is illustrated in cross-sectional view in FIG. 3. The first corner area 360 may include two or more layers of a pouch material, such as a laminate material. The first corner area 360 may include an upper layer 364 and a lower layer 366. The upper layer 364 may be formed by a first portion of laminate, and the lower layer 366 may be formed by a second portion of the laminate. For example, the upper layer 364 may include a nylon layer 382 with a first thickness 384, an aluminum layer 386 with a second thickness 388, and a polypropylene layer 390 with a third thickness 392. The second thickness 388 may be greater than the first thickness 384 and the third thickness 392. For example, the second thickness 388 may be about 50 microns, while the first thickness 384 and the third thickness 392 may be about 25 microns. The laminate material may have a total thickness of about 0.1 millimeters, or less. Other thicknesses may be used.

Similarly, the lower layer 366 may include a nylon layer 382, an aluminum layer 386, and a polypropylene layer 390. The upper layer 364 and the lower layer 366 may be oriented such that the respective polypropylene layers 390 are in contact with each other, and can adhere to each other or otherwise form a seal, thereby sealing an edge of the pouch. The respective nylon layers 382 of the upper layer 364 and the lower layer 366 may form an outside of the pouch and/or the pouch battery 300.

The cathode of the pouch battery 300 may be electrically coupled to one or more portions of at least one of the aluminum layers 386. For example, the aluminum layer 386 of the upper portion 364 may have a first portion at the first corner area 360 that can be used to electrically couple the cathode to the aluminum layer. Specifically, the first portion may be adjacent to a corner 362 of the pouch. At the first corner area 360, the fourth heat sealed portion 330 may overlap the first heat sealed portion 320, or vice versa. As a result, a distance between the corner 362 and the interior portion 310 may be greater than the first sealed width 322 and/or a sealed width of the fourth sealed portion 330. As a result, the sealed portion at the first corner area 360 may be greater than a minimum needed to prevent leakage of the contents of the interior portion 310 of the pouch battery 300. Therefore, the overlapping sealed portion at the first corner area 360 may be separated or unsealed, so as to expose at least one of the aluminum layers 386. The exposed aluminum layer may be a useable contact area 380 that can be used for the electrical connection between the cathode and the aluminum layer 386 without increasing a risk of leakage of the battery contents in the interior portion 310. Other embodiments may include corner shapes of certain geometries, such as corners formed as earlobes, so as to facilitate electrical contact. Connections along the sides or other corners may be made in other embodiments.

A radius or diagonal width 372 of the seal at the first corner area 362 may be at least as large as the widths of the other sealed portions, or may otherwise be sufficient to prevent leakage and create a diffusion barrier against air and moisture at the interface between the polypropylene layers. In some embodiments, the diagonal width 372 may be less than the width of one or more of the other sealed portions. In some embodiments, the cathode may be electrically coupled to at least one of the aluminum layers 386 at a second portion, which may correspond to a second corner area of the pouch battery 300. The diagonal width 372 may be greater than the first width 322 and/or the second width 352. For example, the diagonal width 372 may be about 2.5 millimeters, while the first width 322 and/or the second width 352 may be about 2 millimeters. The connection point at the usable contact area 380 may be made with, for example, an electrically conductive foam, a clip, a punch pin, a snap, solder wire, a solder bump/pad, and/or other embedded electrical connectivity components.

In some embodiments, either the aluminum layer 386 of the upper layer 364 of the pouch, or the aluminum layer 386 of the lower layer 366 of the pouch may be electrically coupled to the cathode of the pouch battery 300. In some instances, both of the aluminum layers 386 of the upper layer 364 and the lower layer 366 may be in electrical communication with the cathode of the pouch battery 300.

Figure 4:
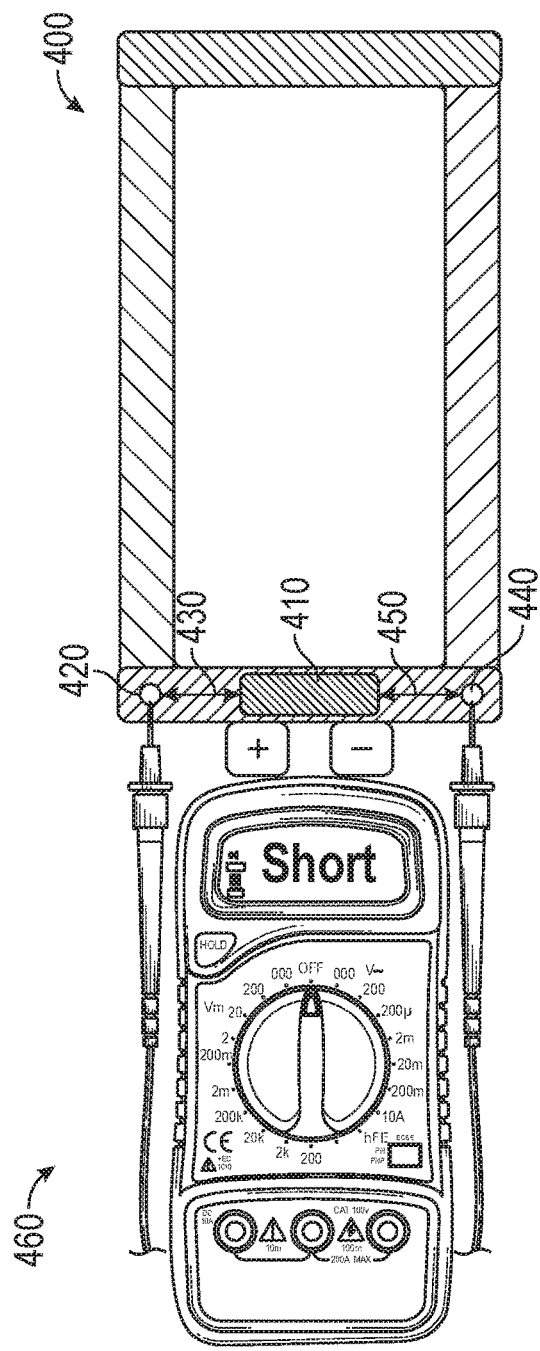
FIG. 4 is a schematic drawing of a swelling resistant pouch battery with an aluminum layer having a voltage potential or an electrical potential difference within a certain range in accordance with one or more embodiments of the disclosure.
Figure 4:
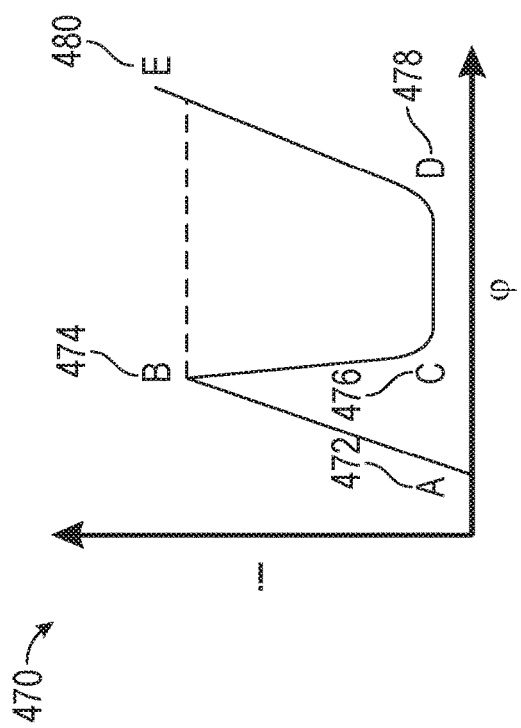

FIG. 4 is a schematic drawing of a swelling resistant pouch battery 400 with an aluminum layer having a voltage potential within a certain range in accordance with one or more embodiments of the disclosure. The pouch battery 400 may have one or more protection circuit modules 410 or circuits that are electrically coupled to the pouch battery 400. For example, in FIG. 4, the protection circuit module 410 may be attached to the pouch battery 400 at a cell terrace area of the pouch battery 400. The cell terrace area may be at a "top side" of the pouch battery 400, or an area where the cathode and/or anode of the pouch battery 400 are externally accessible. The protection circuit module 410 may be configured to prevent overcharging of the pouch battery 400. In some embodiments, the protection circuit module 410 may be electrically coupled to the cathode of the pouch battery 400 and to an aluminum layer of the pouch of the pouch battery 400. For example, the protection circuit module 410 may be coupled to the aluminum layer at a connection point that may be near a corner of the pouch battery 400. The connection point may be a single point of connection between the protection circuit module 410 and the aluminum layer, or, in another embodiment, the protection circuit module 410 may be electrically coupled to the aluminum layer at multiple connection points.

The protection circuit module 410 may be configured to cause a voltage potential at the aluminum layer of the pouch. In some embodiments, the protection circuit module 410 may cause the aluminum layer to have a voltage potential of equal to or greater than about 1.2 volts and less than or equal to about 5 volts. The aluminum layer may not be in electrical communication with the anode of the pouch battery 400. In some embodiments, the protection circuit module 410 may be part of an electronic device that the pouch battery 400 is placed in or otherwise configured to power. In other embodiments, the protection circuit module 410 may be attached to the pouch battery 400 and/or removable from the pouch battery 400 or device.

The pouch battery 400 may include one or more test points that are in electrical communication with the connection points between the cathode (or the protection circuit module 410) and the aluminum layer. The test points may be electrical contacts that can be used to determine whether the aluminum layer is in electrical communication with the cathode. For example, in FIG. 4, a first electrical contact 420 may be electrically coupled 430 to the first portion of the aluminum layer and/or the protection circuit module 410. An optional second electrical contact 440 may be electrically coupled 450 to another portion of the aluminum layer. The first electrical contact 420 and the second electrical contact 440 may be externally accessible.

The test points may be used to verify electrical connectivity of the aluminum layer of the pouch to the positive power line of the protection circuit module 410, which may be electrically connected to the cathode of the pouch battery 400. For example, a resistance or impedance of the aluminum layer may be tested using the first test point or first electrical contact 420 and the second test point or second electrical contact 440. For example, a multimeter 460 may be used to detect a resistance or impedance of the aluminum layer using the first electrical contact 420 and the second electrical contact 440. If the output of the multimeter is a short circuit, the aluminum layer may be coupled to the cathode. If the output is not a short circuit, the aluminum layer may not be coupled to the cathode of the pouch battery 400.

The aluminum layer may be kept at a voltage potential of between about 1 volt and about 5 volts, which may be a stable passivation range for the aluminum layer. A chart 470 illustrating passivation ranges for aluminum is illustrated in FIG. 4, with current on a vertical axis and voltage potential on a horizontal axis. If the aluminum layer has a voltage potential between about 0.5 volts (corresponding to A 472) and 1.0 volts (corresponding to B 474), the rate of corrosion of the aluminum layer may increase, as shown in the chart 470. The region between A 472 and B 474 on the chart 470 may be an active dissolution range. The point B 474 may be a critical passivation point. The region between B 474 and C 476 may be a transition passivation range. If the voltage potential is increased to between about 1.2 volts (corresponding to C 476) and about 5.0 volts (corresponding to D 478), the rate of corrosion of the aluminum layer may be low and stable. The region between C 476 and D 478 may be a stable passivation range. If the voltage potential is increased to greater than about 5.0 volts, the rate of corrosion of the aluminum layer may remain constant. The region between D 478 and E 480 may be a transpassive range. Accordingly, by applying a potential voltage of between about 1.2 volts and about 5.0 volts to the aluminum layer, corrosion resistance may be caused by passivating the electrochemical reactivity of the aluminum layer. Other metals may be used.

By connecting the aluminum layer of the pouch of the pouch battery 400 to the cathode, corrosion of the aluminum layer may be prevented by ensuring the aluminum layer maintains electrochemical stability. The aluminum layer may remain within the passivation voltage window during the operating voltage of the cell of the pouch battery 400.

Figure 5:
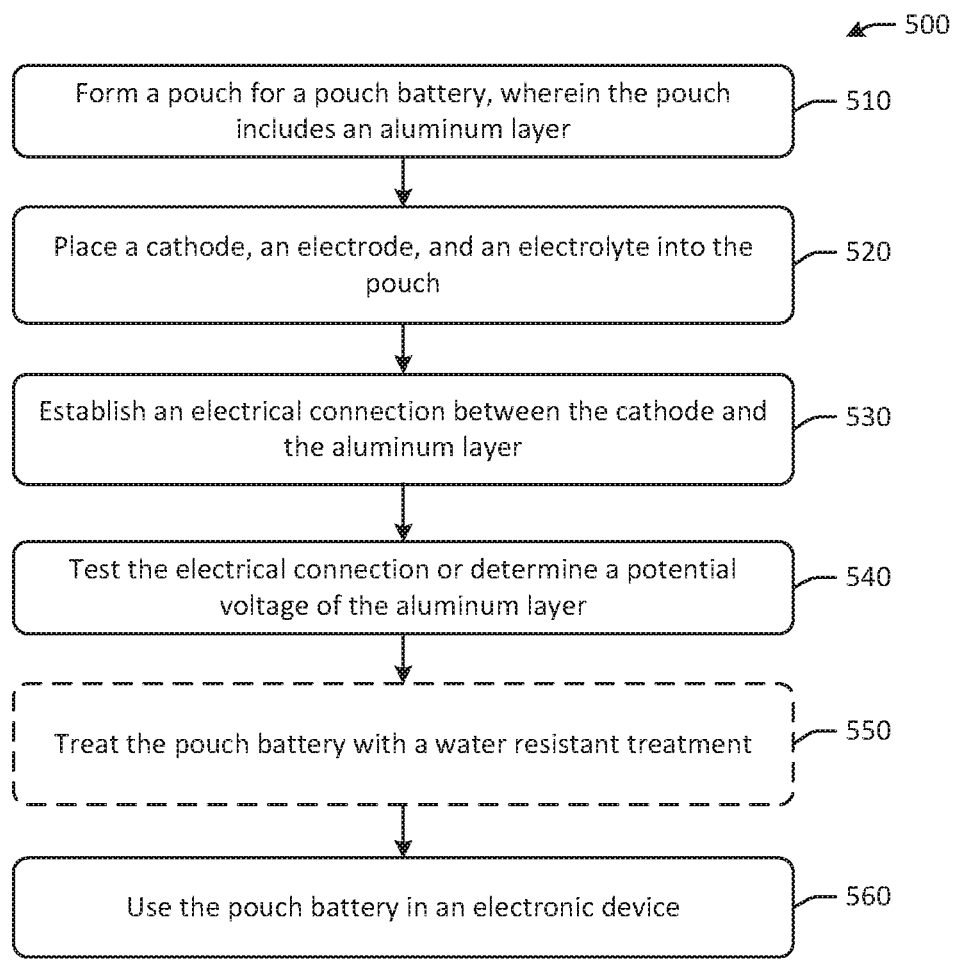
FIG. 5 is an example process flow for manufacturing a swelling resistant pouch battery in accordance with one or more embodiments of the disclosure.

FIG. 5 is an example process flow for manufacturing a swelling resistant pouch battery in accordance with one or more embodiments of the disclosure. At a first operation 510, a pouch for a pouch battery may be formed. The pouch may be at least partially formed of an aluminum material. At a second operation 520, a cell may be placed into the pouch. The cell may include a cathode, an anode, and an electrolyte. At a third operation 530, an electrical connection may be established between the cathode and the aluminum layer. At a fourth operation 540, the pouch battery may be manually tested to determine whether there is an electrical connection between the cathode and the aluminum layer. In some embodiments, a voltage potential of the aluminum layer may be determined. At an optional fifth operation 550, the pouch battery may be treated with a water resistance treatment. For example, a water resistant coating may be applied around at least a portion of the pouch battery. Other examples include an injection molding water resistance process, a water vaporization process, local application of a water protective glue or substance, or another water resistance treatment. At a sixth operation 560, the swelling resistant pouch battery may be used in an electronic device.

One or more operations of the method, process flows, or use cases of FIGS. 1-5 may have been described above as being performed by a user device, or more specifically, by one or more program module(s), applications, or the like executing on a device. It should be appreciated, however, that any of the operations of methods, process flows, or use cases of FIGS. 1-5 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 6:
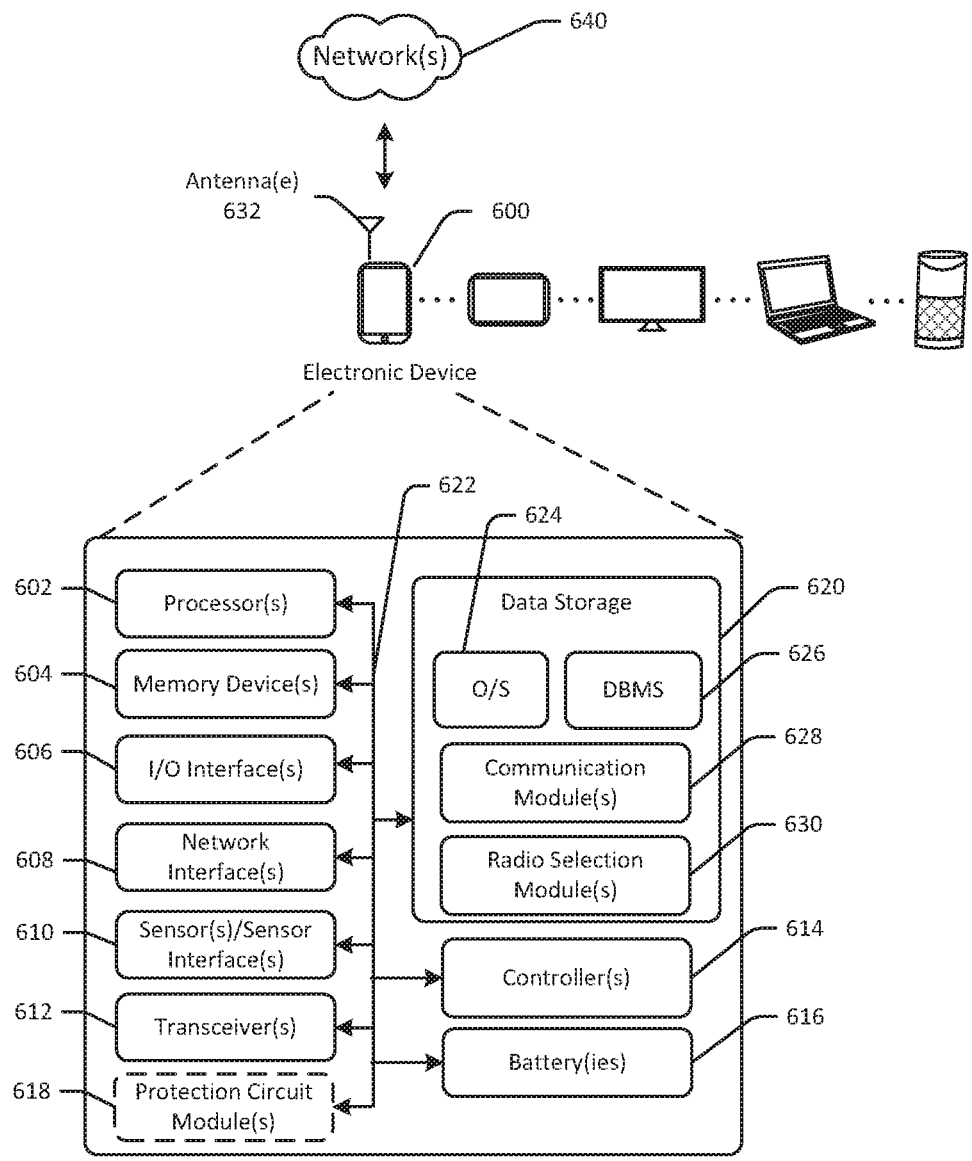
FIG. 6 schematically illustrates an example architecture of an electronic device in accordance with one or more embodiments of the disclosure.

FIG. 6 is a schematic block diagram of one or more illustrative electronic device(s) 600 in accordance with one or more example embodiments of the disclosure. The electronic device(s) 600 may include any suitable computing device including, but not limited to, a server system, a camera or camera system, a mobile device such as a smartphone, a tablet, an e-reader, a wearable device, a speaker device, or the like; a desktop computer; a laptop computer; a content streaming device; a set-top box; or the like. The electronic device(s) 600 may correspond to an illustrative device configuration for the electronic device(s) of FIGS. 1-5.

The electronic device(s) 600 may be configured to communicate via one or more networks with one or more servers, user devices, or the like. The electronic device(s) 600 may have a battery that is configured to prevent swelling or other damage, which may prevent damage to the electronic device(s) 600. The electronic device(s) 600 may be configured to select one or more wireless communication protocols, control operations of remote devices, such an internet of things devices, and other operations.

The electronic device(s) 600 may be configured to communicate via one or more networks 640. Such network(s) 640 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) 640 may have any suitable communication range associated therewith and may include, for example, global networks (e.g., the Internet), metropolitan area networks (MANs), wide area networks (WANs), local area networks (LANs), or personal area networks (PANs). In addition, such network(s) 640 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the electronic device(s) 600 may include one or more processors (processor(s)) 602, one or more memory devices 604 (generically referred to in this section as memory 604), one or more input/output ("I/O") interfaces 606, one or more network interfaces 608, one or more sensors or sensor interfaces 610, one or more transceivers 612, one or more controllers 614, one or more batteries 616, one or more optional protection circuit module(s) 618, and data storage 620. The electronic device(s) 600 may further include one or more buses 622 that functionally couple various components of the electronic device(s) 600. The electronic device(s) 600 may optionally include one or more antenna(e) 632 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, an RFID antenna, and so forth.

The bus(es) 622 may include at least one of a system bus, a memory bus, an address bus, or a message bus, and may permit the exchange of information (e.g., data (including computer-executable code), signaling, etc.) between various components of the electronic device(s) 600. The bus(es) 622 may include, without limitation, a memory bus or a memory controller, a peripheral bus, an accelerated graphics port, and so forth. The bus(es) 622 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the electronic device(s) 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to the memory 604 for use by the processor(s) 602 during the execution of the computer-executable instructions. Moreover, output data generated as a result of execution of the computer-executable instructions by the processor(s) 602 may be stored initially in the memory 604, and may ultimately be copied to data storage 620 for non-volatile storage.

More specifically, the data storage 620 may store one or more operating systems (O/S) 624; one or more database management systems (DBMS) 626; and one or more program module(s), applications, engines, computer-executable code, scripts, or the like such as, for example, one or more communication module(s) 628 and/or one or more voltage detection module(s) 630. Some or all of these module(s) may be or include sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support the functionality described in reference to the corresponding components named earlier in this disclosure.

The data storage 620 may further store various types of data utilized by the components of the electronic device(s) 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 626 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, an example datastore(s) may include, for example, user account or user profile data, user device or battery settings, user device preferences and authorizations, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the electronic device(s) 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), Image Signal Processor (ISP), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the communication module(s) 628 may include computer-executable instructions, code, or the like that responsive to execution by one or more of the processor(s) 602 may perform functions including, but not limited to, communicating with remote servers or devices, communicating with remote datastores, communicating with local servers or devices on an intranet, sending or receiving information and instructions, sending or receiving orders, and the like.

The voltage detection module(s) 630 may include computer-executable instructions, code, or the like that responsive to execution by one or more of the processor(s) 602 may perform functions including, but not limited to, determining a voltage potential of one or more layers or components of a battery, controlling operation of a protection circuit module, and the like.

Referring now to other illustrative components depicted as being stored in the data storage 620, the 0/S 624 may be loaded from the data storage 620 into the memory 604 and may provide an interface between other application software executing on the electronic device(s) 600 and the hardware resources of the electronic device(s) 600. More specifically, the 0/S 624 may include a set of computer-executable instructions for managing the hardware resources of the electronic device(s) 600 and for providing common services to other application programs (e.g., managing memory allocation among various application programs). In certain example embodiments, the 0/S 624 may control execution of the other program module(s) to dynamically enhance characters for content rendering. The O/S 624 may include any operating system now known or which may be developed in the future including, but not limited to, any server operating system, any mainframe operating system, or any other proprietary or non-proprietary operating system.

The DBMS 626 may be loaded into the memory 604 and may support functionality for accessing, retrieving, storing, and/or manipulating data stored in the memory 604 and/or data stored in the data storage 620. The DBMS 626 may use any of a variety of database models (e.g., relational model, object model, etc.) and may support any of a variety of query languages. The DBMS 626 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device(s) 600 is a mobile device, the DBMS 626 may be any suitable light-weight DBMS optimized for performance on a mobile device.

Referring now to other illustrative components of the electronic device(s) 600, the input/output (I/O) interface(s) 606 may facilitate the receipt of input information by the electronic device(s) 600 from one or more I/O devices as well as the output of information from the electronic device(s) 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device(s) 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), micro-USB, FireWire, Thunderbolt, Ethernet port or other connection protocol that may connect to one or more networks. The I/O interface(s) 606 may also include a connection to one or more of the antenna(e) 632 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, a WiMAX network, a 3G network, a ZigBee network, etc.

The electronic device(s) 600 may further include one or more network interface(s) 608 via which the electronic device(s) 600 may communicate with any of a variety of other systems, platforms, networks, devices, and so forth. The network interface(s) 608 may enable communication, for example, with one or more wireless routers, one or more host servers, one or more web servers, and the like via one or more networks.

The optional antenna(e) 632 may include any suitable type of antenna depending, for example, on the communications protocols used to transmit or receive signals via the antenna(e) 632. Non-limiting examples of suitable antennae may include directional antennae, non-directional antennae, dipole antennae, folded dipole antennae, patch antennae, multiple-input multiple-output (MIMO) antennae, or the like. The antenna(e) 632 may be communicatively coupled to one or more transceivers 612 or radio components to which or from which signals may be transmitted or received.

As previously described, the antenna(e) 632 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 632 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 632 may be configured to transmit or receive radio frequency signals within any suitable frequency range forming part of the unlicensed portion of the radio spectrum.

The antenna(e) 632 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 632—transmitting or receiving radio frequency (RF) signals in the bandwidth and/or channels corresponding to the communications protocols utilized by the electronic device(s) 600 to communicate with other devices. The transceiver(s) 612 may include hardware, software, and/or firmware for modulating, transmitting, or receiving—potentially in cooperation with any of antenna(e) 632—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the electronic device(s) 600. The transceiver(s) 612 may further include a low noise amplifier (LNA), additional power signal amplifiers (PA), an analog-to-digital (A/D) converter, one or more buffers, a digital baseband, or the like.

The controller(s) 614 may be any microcontroller or microprocessor configured to control one or more operations of the electronic device(s) 600. The battery(ies) 616 may be a swelling resistant pouch battery configured to power the electronic device(s) 600. For example, the battery 616 may be a lithium-ion battery. The battery 616 may be coupled to the one or more optional protection circuit module(s) 618. The one or more optional protection circuit module(s) 618 may be configured to prevent overheating and/or expansion or other damage of the battery 616. In some embodiments, the one or more optional protection circuit module(s) 618 may be used to determine a voltage potential of one or more layers or components of the battery 616.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 6 as being stored in the data storage 620 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device(s) 600, and/or hosted on other computing device(s) accessible via one or more networks, may be provided to support the functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the electronic device(s) 600 may include alternate and/or additional hardware, software, or firmware components beyond those described or depicted without departing from the scope of the disclosure. More particularly, it should be appreciated that software, firmware, or hardware components depicted as forming part of the electronic device(s) 600 are merely illustrative and that some components may not be present or additional components may be provided in various embodiments. While various illustrative program module(s) have been depicted and described as software module(s) stored in the data storage 620, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, schematics, and use cases of FIGS. 1-5 may be performed by a device having the illustrative configuration depicted in FIG. 6, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A lithium-ion pouch battery comprising:
    a flexible battery pouch comprising:
        a trilaminate material, the trilaminate material comprising a polypropylene layer, a nylon layer, and an aluminum layer positioned between the polypropylene layer and the nylon layer, wherein the nylon layer forms an outer surface of the lithium-ion pouch battery;
        a first sealed portion along a first side of the flexible battery pouch;
        a second sealed portion along a second side of the flexible battery pouch, wherein the second side is parallel to the first side; and
        a third sealed portion along a top side of the flexible battery pouch, the top side perpendicular to the first side and the second side, wherein the third sealed portion overlaps with the first sealed portion at a first corner area, and wherein the third sealed portion overlaps with the second sealed portion at a second corner area;
    a lithium-ion cell positioned within an interior portion of the flexible battery pouch, the lithium-ion cell comprising an electrolyte, a cathode, and an anode, wherein the cathode and the anode are in contact with the electrolyte; and
    a protection circuit module positioned at a cell terrace area along the top side of the flexible battery pouch, the protection circuit module configured to prevent overcharging of the lithium-ion pouch battery, wherein the protection circuit module is directly coupled to (i) the cathode of the lithium-ion cell, (ii) the aluminum layer of the trilaminate material at the first corner area, and (iii) the aluminum layer of the trilaminate material at the second corner area.

2. The lithium-ion pouch battery of claim 1, wherein a steady-state potential difference of the aluminum layer with respect to the anode is equal to or greater than about 1.5 volts.

3. The lithium-ion pouch battery of claim 1, further comprising a first test point electrically coupled to the aluminum layer at the first corner area;
   a second test point electrically coupled to the aluminum layer at the second corner area; and
   a third test point electrically coupled to a positive power line that is in communication with the cathode, the third test point positioned between the cathode and the first test point;
   wherein a resistance of the aluminum layer can be tested using the first test point and the second test point.

4. The lithium-ion pouch battery of claim 1, wherein the first sealed portion has a width from a first edge of the flexible battery pouch to the interior portion of the flexible battery pouch, the second sealed portion has the width from a second edge of the flexible battery pouch to the interior portion, and the third sealed portion has the width from a top edge of the flexible battery pouch to the interior portion;
   wherein a first distance between a first corner of the flexible battery pouch and the interior portion is greater than the width; and
   wherein a second distance between a second corner of the flexible battery pouch and the interior portion is greater than the width.

5. A battery comprising:
   a pouch having an aluminum layer comprising a first portion and a second portion;
   at least one cell partially positioned within the pouch, the at least one cell comprising an anode, a separator, a cathode, and an electrolyte;
   a circuit directly coupled to both the cathode and to the first portion of the aluminum layer, wherein the circuit is configured to cause a potential difference at the aluminum layer with respect to the anode; and
   a first electrical contact electrically coupled to the first portion of the aluminum layer.

6. The battery of claim 5, wherein the pouch further comprises an upper portion and a lower portion, wherein the aluminum layer is folded so as to partially form the upper portion and the lower portion.

7. The battery of claim 5, wherein the second portion of the aluminum layer is part of the lower portion of the pouch, and the circuit is electrically coupled to the second portion.

8. The battery of claim 5, further comprising a folded side at one or more sides of the pouch.

9. The battery of claim 5, further comprising a second electrical contact that is electrically coupled to the second portion of the aluminum layer; and
   a third electrical contact that is electrically coupled to a positive power line of the circuit in between the cathode and the first electrical contact;
   wherein the first electrical contact and the second electrical contact are externally accessible with respect to the pouch.

10. The battery of claim 5, wherein the first portion is at a first corner of the pouch, and wherein the second portion is at a second corner of the pouch.

11. The battery of claim 5, wherein the pouch further comprises:
   a first sealed portion at a first side of the pouch;
   a second sealed portion at a second side of the pouch;
   a third sealed portion at a third side of the pouch, wherein the third side is perpendicular to the first side and the second side;
   a first corner area where the first sealed portion overlaps with the third sealed portion; and
   a second corner area where the second sealed portion overlaps with the third sealed portion;
   wherein the first portion is at the first corner area, and the second portion is at the second corner area.

12. The battery of claim 11, wherein the first sealed portion has a first width, the second sealed portion has a second width, and the third sealed portion has a third width;
   wherein the first corner area has a fourth width that is greater than the first width, the second width, and the third width; and
   wherein the second corner area has a fifth width that is greater than the first width, the second width, and the third width.

13. The battery of claim 5, further comprising a cell terrace area at a side of the battery that the cathode and the anode are externally accessible with respect to the pouch, wherein the circuit is external to the pouch and positioned at the cell terrace area.

14. The battery of claim 5, wherein the potential difference at the aluminum layer is equal to or greater than about 1.5 volts with respect to the anode.

15. The battery of claim 5, wherein the pouch further comprises a polypropylene layer that is positioned between the aluminum layer and the electrolyte; and
   wherein the aluminum layer is not in electrical communication with the anode.

16. The battery of claim 5, further comprising a water resistant coating around at least a portion of the battery.

17. A device comprising:
   a battery comprising:
      a laminate material comprising an aluminum layer;
      a cathode;
      a separator;
      an anode; and
      an electrolyte;
      a circuit directly coupled to both the cathode and the aluminum layer, wherein the circuit is electrically coupled to the aluminum layer at a connection point and is configured to cause a potential difference at the aluminum layer with respect to the anode; and
   at least one test point electrically coupled to the connection point.

18. The device of claim 17, wherein the circuit comprises a protection circuit module, and wherein the circuit is attached to the device.

19. The device of claim 17, wherein the circuit is attached to the battery and is removable from the device.

20. The device of claim 17, wherein the connection point is a single point of connection between the circuit and the aluminum layer.

* * * * *